UNITED STATES PATENT OFFICE.

WILLIAM ADAMSON, OF PHILADELPHIA, PENNSYLVANIA.

IMPROVEMENT IN STOCK FOR PAPER-MAKERS' SIZE.

Specification forming part of Letters Patent No. 211,367, dated January 14, 1879; application filed December 2, 1878.

*To all whom it may concern:*

Be it known that I, WILLIAM ADAMSON, of Philadelphia, Pennsylvania, have invented a new and useful Improvement in Stock for Paper-Makers' Size, of which the following is a specification:

The object of my invention is to furnish consumers of paper-makers' size with stock ready for conversion, by simple boiling, into size of superior quality.

The sizing-stock usually furnished to paper-makers and other consumers is prepared by glue manufacturers from every description of glue-producing animal offal, the sizing being in a condition ready for reducing to size by the consumers.

In carrying out my invention I take rawhide or bones, and other glue-producing animal matter, which has been treated with lime, as usual, and disintegrate and reduce the same to a pulpy mass, which I thoroughly cleanse by washing. I then drain the greater portion of the water from it by a centrifugal machine, or otherwise, or press it into slabs or in bags, so as to form cakes, which are finally dried for transportation, and are ready for conversion into the desired size by simple steeping and boiling.

Several advantages are derived from this plan of manufacturing size-stock: First, there is more certainty of the production of a superior size by this plan than by that now practiced, with more refractory glue-stock, for the long-continued boiling of the raw material in the usual glue kettles or vats tends to discolor the size, whereas the slabs or cakes, being composed of small particles, readily yield to the dissolving influence of water; second, there is a good opportunity of selecting and compounding different qualities of gelatine-producing animal matter for making size of different qualities—for instance, all hides and skins and all parts of hides and skins are not of themselves suitable as stock for producing good size, and must be tempered by the admixture therewith of prepared bones and other gelatinous matter, which has a tendency to make the size hard, transparent, and colorless.

When a very tough and elastic size is required, I mix Irish moss or other gelatinous vegetable matter in about the proportion of ten or twenty per cent. of the whole mass with the animal matter.

I claim as my invention—

1. The mode described of preparing size-stock—that is to say, first disintegrating and pulping gelatinous animal matter, then washing it, and afterward forming the mass into slabs or cakes, as set forth.

2. As a new manufacture, slabs or cakes of size-stock consisting of gelatinous animal matter pulped, drained, and pressed, as specified.

3. A size-stock consisting of combined animal and vegetable gelatinous matter, as specified.

In testimony whereof I have signed my name to this specification in the presence of two subscribing witnesses.

WM. ADAMSON.

Witnesses:
ALEX. PATTERSON,
HARRY SMITH.